(12) United States Patent
Arizono et al.

(10) Patent No.: US 9,403,373 B2
(45) Date of Patent: Aug. 2, 2016

(54) COLOR CHART CREATING METHOD AND A COLOR CORRECTING METHOD

(71) Applicant: SCREEN Holdings CO., LTD., Kyoto (JP)

(72) Inventors: Shigenori Arizono, Kyoto (JP); Satoru Kiyohara, Kyoto (JP); Koji Matsuo, Kyoto (JP); Ryoko Sakurai, Kyoto (JP)

(73) Assignee: Screen Holdings Co., Ltd., Kyoto (JP)

( * ) Notice: Subject to any disclaimer, the term of this patent is extended or adjusted under 35 U.S.C. 154(b) by 0 days.

(21) Appl. No.: 14/730,215

(22) Filed: Jun. 3, 2015

(65) Prior Publication Data

US 2016/0023472 A1    Jan. 28, 2016

(30) Foreign Application Priority Data

Jul. 25, 2014  (JP) ................. 2014-151431

(51) Int. Cl.
*H04N 1/60*     (2006.01)
*H04N 1/46*     (2006.01)
*B41J 2/21*     (2006.01)

(52) U.S. Cl.
CPC ............. *B41J 2/2132* (2013.01); *H04N 1/46* (2013.01); *H04N 1/605* (2013.01); *H04N 1/6033* (2013.01)

(58) Field of Classification Search
CPC ................................... H04N 1/605
See application file for complete search history.

(56) References Cited

U.S. PATENT DOCUMENTS

| 6,343,194 B1 * | 1/2002 | Shimada | B41J 2/17566 358/1.9 |
| 2011/0310152 A1 * | 12/2011 | Muro | B41J 3/407 347/14 |
| 2012/0218574 A1 | 8/2012 | Fukuda et al. | |
| 2013/0194327 A1 * | 8/2013 | Hara | B41J 2/195 347/7 |

FOREIGN PATENT DOCUMENTS

| JP | 2004-349980 A | 12/2004 |
| JP | 2012-164044 A | 8/2012 |

OTHER PUBLICATIONS

Extended European Search Report issued in Application No. 15171231 dated Dec. 8, 2015.

* cited by examiner

*Primary Examiner* — Shelby Fidler
(74) *Attorney, Agent, or Firm* — McDermott Will & Emery LLP

(57) ABSTRACT

In printing image data for printing a color chart with a printing machine, instead of using a TAC value which is a total of CMYK values given to one pixel as a limit of ink amount supplied to a printing medium as done conventionally, creation of a color chart having a large color gamut is realized by considering and adjusting the amount of inks per unit area actually consumed at the time of printing and drying performance of each ink.

4 Claims, 8 Drawing Sheets preparation step A preparation step B correction of
printer-dependent color space
colorimetric values based on
measured ink amounts

COLOR CHART CREATING METHOD AND A COLOR CORRECTING METHOD

RELATED APPLICATIONS

This application claims the benefit of Japanese Application No. 2014-151431, filed on Jul. 25, 2014, the disclosure of which Application is incorporated by reference herein.

BACKGROUND OF THE INVENTION

1. Field of the Invention

This invention relates to a color chart creating method for creating color charts for use in color correction of an inkjet printer, and to a color correcting method.

2. Description of the Related Art

In a printing system which carries out digital color printing, a different color definition is used for each of a display device such as a liquid crystal display for displaying images, a scanner for reading images, and a printing machine for performing printing. A color management for controlling printing colors of the printing machine is carried out by putting such different color definition for each digital device to a color conversion among one another using ICC profiles. The ICC profiles are files of formats specified by the International Color Consortium, and are files defining characteristics of the color spaces of devices.

A color printing machine performs printing, using the four color materials of cyan (C), magenta (M), yellow (Y) and black (K) which are generally called process colors. An inkjet printer includes inkjet heads for the respective colors, each head having a plurality of nozzles for discharging ink. When carrying out color printing with such inkjet printer, color charts are printed for use in color correction. Such a color chart has, arranged thereon, a plurality of color patches combining ink color types and dot size types (see Japanese Unexamined Patent Publication No. 2012-164044, for example).

Each color patch on the printed color chart is measured with a colorimetric machine, and ICC profiles are created based on the results obtained.

With a conventional inkjet printer, a limit is set to a total amount of inks due to restrictions of various conditions such as characteristics of inks and water absorption characteristics of a printing medium. The total amount of inks, when the process colors are the four colors of CMYK, is a sum total of the inks of CMYK superimposed for each pixel, which is also called a TAC (Total Area Coverage) value. The inkjet printer therefore has a color reproduction range (color gamut) variable with a limiting value represented by the TAC value (see Japanese Unexamined Patent Publication No. 2004-349980, for example).

In the inkjet printer, the printing medium is transported by rollers. The printing surface of the printing medium contacts the rollers, whereby the ink is transferred to the rollers, and further the ink is transferred from the rollers back to the printing medium, thereby causing a problem of tinting prints. Therefore, the limiting TAC value is set low to prevent the ink transfer to the rollers due to insufficient drying of the ink.

On the other hand, there are various types of inks and printing media used in inkjet printers. While the drying performance of inks depends on the amount of inks applied to a print medium, this drying performance varies with the compositions of the inks.

Therefore, when the limiting TAC value is set low as conventionally done in order to prevent the ink transfer to the rollers due to insufficient drying of the inks, there will arise a problem that the color chart has a color gamut reduced in size.

Further, when color correction is carried out based on the color chart with a small color gamut, there will arise a problem that the resulting coloring on prints is different from what is intended.

SUMMARY OF THE INVENTION

The object of this invention, therefore, is to provide a color chart creating method and a color correcting method for creating a color chart with an enlarged color gamut for use in an inkjet printer.

The above object is fulfilled, according to this invention, by a color chart creating method for creating a color chart having a plurality of color patches arranged thereon for color correction of an inkjet printer, the method comprising an ink amount setting step for setting an upper limit to ink amount per unit area that can be supplied to a printing medium, based on amounts of ink consumption when printing is done beforehand with the inkjet printer; and a printing step for printing with the inkjet printer the color chart having the plurality of color patches arranged thereon and formed of different colors on the printing medium using ink amounts smaller than the upper limit set in the ink amount setting step.

The above color chart creating method sets an upper limit to ink amount per unit area that can be supplied to a printing medium, based on amounts of ink consumption rather than a limitation by the TAC value used conventionally. This realizes creation of a color chart having an enlarged color gamut.

In one preferred embodiment, the ink amount setting step is preceded by an ink amount acquiring step for obtaining actual measurements of ink amounts with respect to colorimetric values in a device-dependent color space of each color patch based on the amounts of ink consumption when printing is done beforehand with the inkjet printer, and determining an upper limit of ink amount per unit area that can be supplied to the printing medium based on drying performance of inks, and the upper limit determined in the ink amount acquiring step is set in the ink amount setting step.

Such color chart creating method creates the color patches by obtaining actual measurements of ink amounts, determining an upper limit of ink amount taking drying performance of inks into consideration, and setting this upper limit as upper limit of ink amount per unit area that can be supplied to the printing medium. This realizes creation of a color chart having an enlarged color gamut.

In another preferred embodiment, the ink amount acquiring step is executed by observing an ink transfer to a transport roller which contacts a printing surface of the printing medium when beltlike areas of different ink amounts per unit area are printed for each of a plurality of colors beforehand on the printing medium with the inkjet printer, and setting an ink amount per unit area of the printing medium free from the ink transfer to the transport roller as the upper limit.

Such color chart creating method can determine an upper limit of ink amount that can be applied per unit area for each separate color by taking into consideration differences in drying performance due to different ink compositions. This realizes a stricter definition of color gamuts.

According to a different aspect of this invention, a color correcting method is provided which comprises a colorimetric step for measuring with a colorimetric machine the color chart created by the above color chart creating method; and a profile creating step for forming a relationship between device-independent color space and device-dependent color space based on a measurement result in the colorimetric step.

The above color correcting method creates a profile defining a relationship between device-independent color space and device-dependent color space based on the color chart having a large color gamut. This enables color reproduction to be performed with increased accuracy by an inkjet printer.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
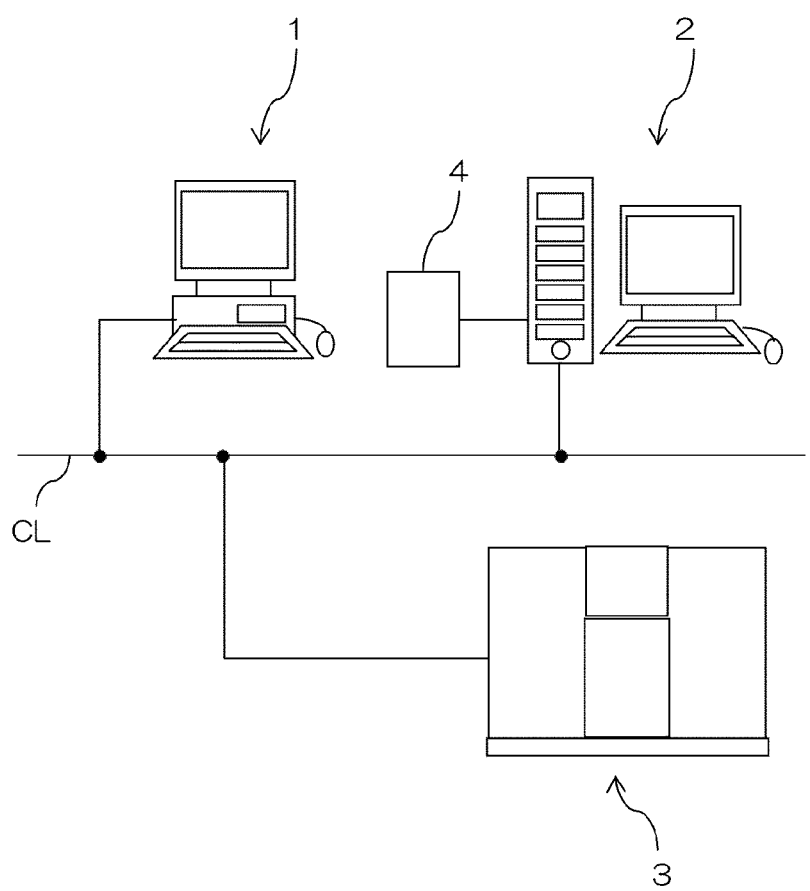
FIG. 1 is a schematic view of a printing system for executing a color chart creating method according to this invention.

An embodiment of this invention will be described hereinafter with reference to the drawings. FIG. 1 is a schematic view showing a construction of a printing system for executing a color chart creating method according to this invention.

This printing system includes a client computer 1 for creating manuscript data by arranging and editing plural types of parts such as characters and pictures which make up prints, a printing machine 3 for executing printing, an image processing apparatus 2 for carrying out a process of generating a color profile (ICC profile) which controls printing colors, a color conversion process using the color profile, and a rasterizing process (RIP) for generating print data processable by the printing machine 3, and a colorimetric machine 4 connected to the image processing apparatus 2. The client computer 1, data processing apparatus 2 and printing machine 3 can transmit and receive various information to and from one another through a communication line CL connected to a network such as a LAN (Local Area Network).

Figure 2:
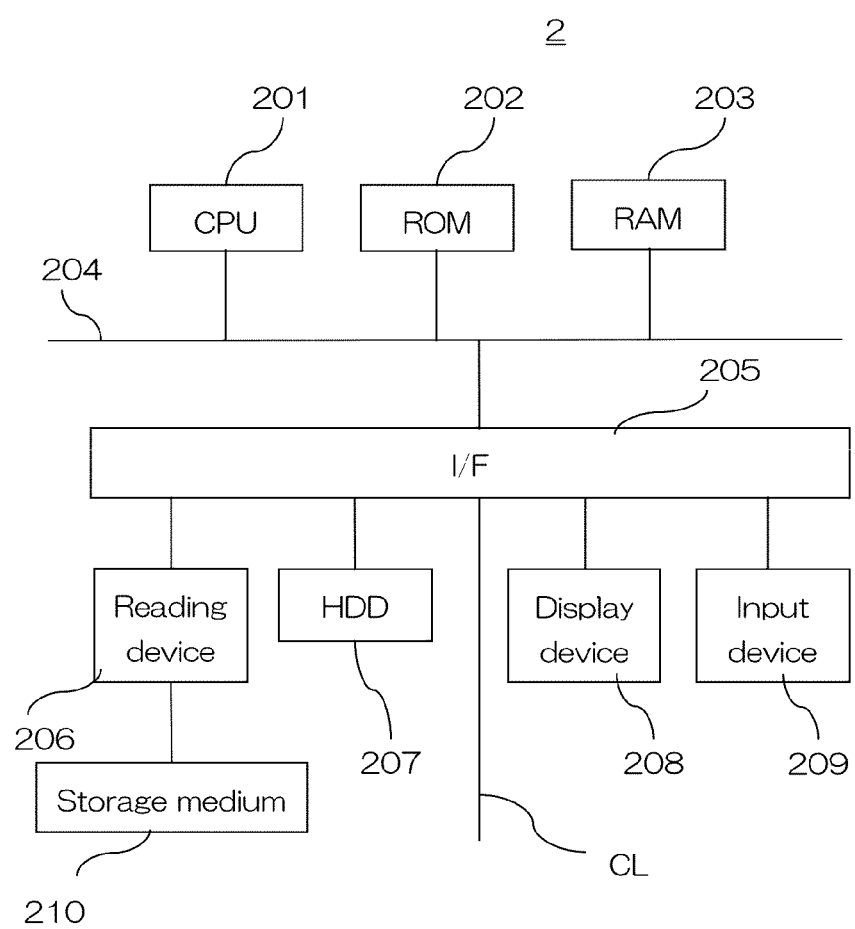
FIG. 2 is a block diagram showing a hardware configuration of an image processing apparatus.

FIG. 2 is a block diagram showing a hardware configuration of the image processing apparatus 2.

The image processing apparatus 2 is realized by using a personal computer, which includes a CPU 201, a ROM 202, a RAM 203, an interface 205, a reading device 206 such as a disk drive for reading information from a portable storage medium 210 such as a CD-ROM, an HDD (hard disk) 207 which is a magnetic disk, a display device 208 such as a liquid crystal display, and an input device 209 such as a keyboard and a mouse.

The CPU 201, ROM 202, RAM 203 and interface 205 are connected to one another through a bus 204. The reading device 206, HDD 207 and communication line CL are connected to the interface 205. The display device 208 displays information including various settings in the image processing system 2. The input device 209 is used by the operator in changing the various settings.

The image processing apparatus 2 can communicate with the client computer 1 and printing machine 3 through the communication line CL connected to the interface 205. The HDD 207 stores various data and programs such as for creating ICC profiles. When a program stored on the HDD 207 is executed, the program is loaded into the ROM 202, and its functions are realized using the RAM 203 and CPU 201. Data such as of colorimetric values of the respective color patches obtained by measurement made of a color chart by the colorimetric machine 4 is stored in the RAM 203 or HDD 207.

Figure 3:
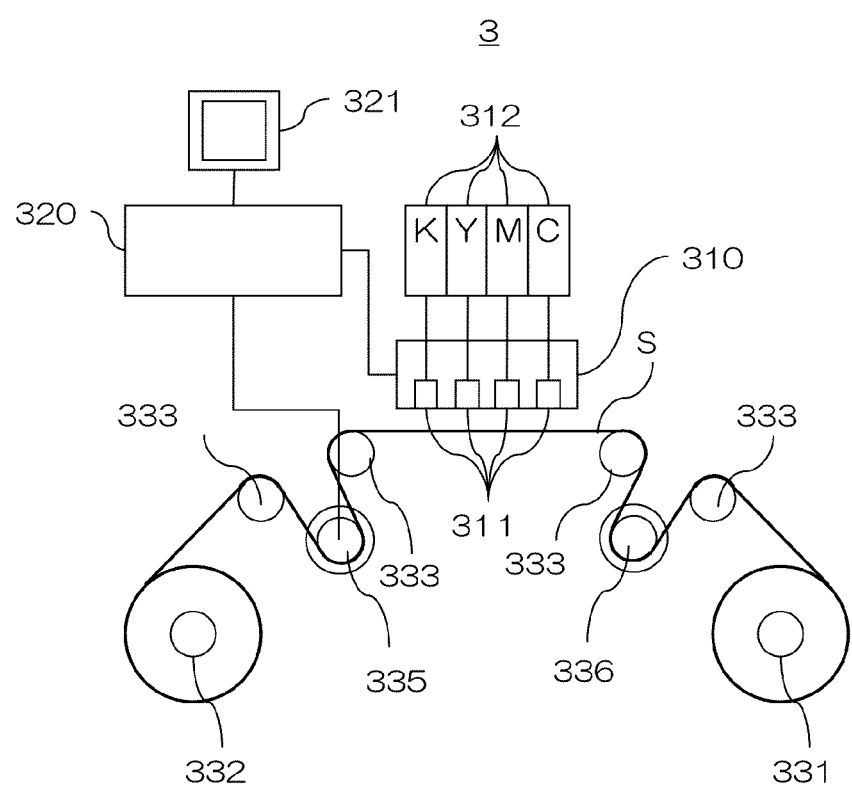
FIG. 3 is a schematic view of a printing machine.

FIG. 3 is a schematic view of the printing machine 3.

The printing machine 3 has a printing medium S which is roll paper wound on an unwinding roller 331, a takeup roller 332, a plurality of tension rollers 333, a drive roller 335 and a driven roller 336. The printing medium S is transported by drive of a drive motor connected to the drive roller 335. This is an inkjet printer for recording images in inkjet mode on the printing medium S.

This printing machine 3 includes a recorder 310 having a plurality of inkjet heads 311 with nozzles arranged thereon for discharging a plurality of ink droplets, a controller 320, and a printing control monitor 321 for displaying information on ink consumption situations of the printing machine 3, for example. The recorder 310 has an arrangement of inkjet heads 311 corresponding to the respective colors of Y (yellow), M (magenta), C (cyan) and K (black). Ink tanks 312 storing the respective inks are connected to the inkjet heads 311 of the corresponding colors. The controller 320, based on CMYK value data inputted from the image processing system 2, performs printing control for discharging the inks from the nozzles and drive control of the drive motor. With such recorder 310 and controller 320, color printing is carried out on the printing medium S. Note that an inkjet type sheet-fed printer may also be employed as the output machine in this printing system.

Figure 4:
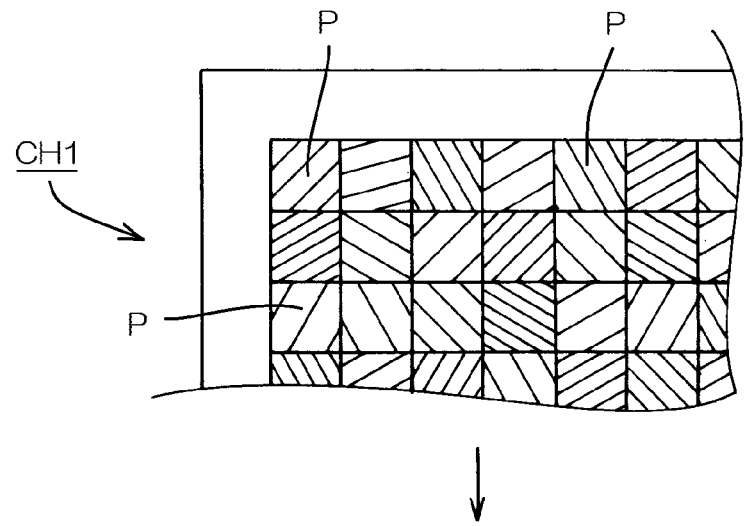
FIG. 4 is a conceptual diagram illustrating color chart creation.
Figure 4:
Figure 4:
Figure 4:
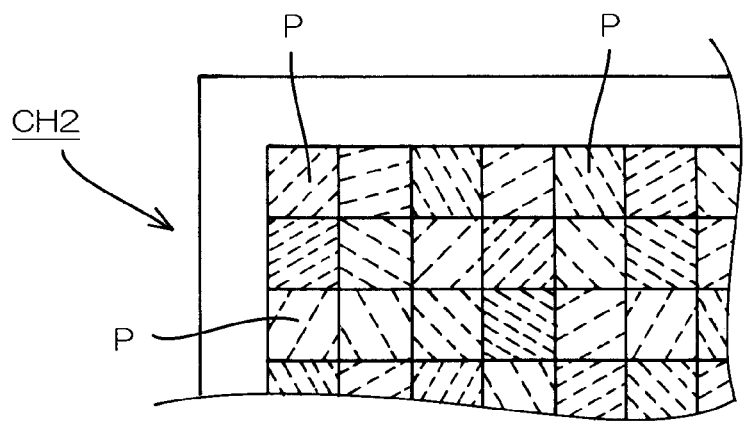

FIG. 4 is a conceptual diagram illustrating color chart creation in this invention. This figure shows different color patches P arranged on color charts CH1 and CH2 in different hatch patterns. Each of the color charts CH1 and CH2 has a matrix arrangement of patches in varied densities of primary, secondary, tertiary and quartic colors, e.g. of CMYK.

Where, as with the printing machine 3, the process colors consist of the four colors of CMYK, the maximum of the TAC value is 400%. This is what is called a total solid state where 100% ink density is designated for all the colors of CMYK. When image data is converted from RGB values to CMYK values, for example, this color that has the TAC value at 365% should normally be separated as CMYK=(95, 85, 95, 90). However, since the TAC value is conventionally restricted to 300 to 350%, when the TAC value is limited to 320%, the data will be converted into CMYK values not exceeding this limit. This gives rise to a problem of changing the color tone of prints. That is, the limit of the TAC value results in a limitation on the color gamut which is a range of color reproducible by printing.

Ideally, it is desirable to carry out color correction using a color chart (see the upper color chart CH1 in FIG. 4) having a plurality of color patches P (of 1000 to 1500 colors, for example) outputted by setting the TAC value to 400% which is free from the problem of a limited color gamut. In reality, however, there will arise inconveniences, such as an ink overflow on the printing medium S and ink staining of the transporting system for the printing medium S. In order to avoid such inconveniences, it is necessary to limit the amount of inks supplied to the printing medium S at the time of printing. In printing image data for printing a color chart with the printing machine 3, instead of using a TAC value which is a total of CMYK values given to each pixel as the limit of ink amounts supplied to the printing medium S as done conventionally, this invention realizes creation of the color chart CH2 having a large color gamut by creating each color patch by considering and adjusting the amount of ink per unit area actually consumed at the time of printing and the drying performance of each ink.

Figure 5A:
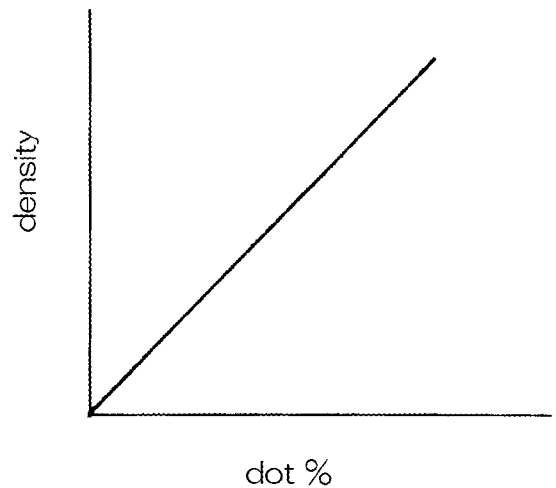
FIG. 5A is a view illustrating a relationship between amount of ink adhesion and dot percentage.
Figure 5B:
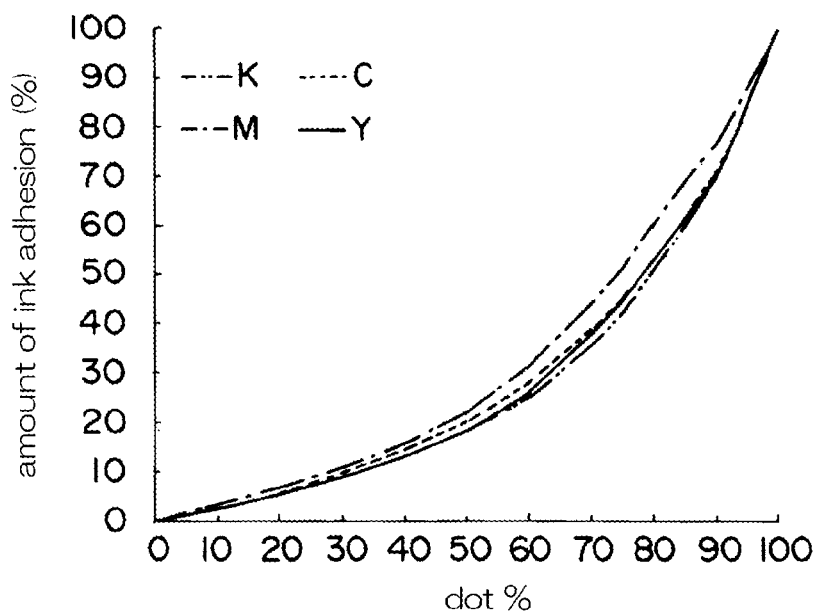
FIG. 5B is a view illustrating a relationship between amount of ink adhesion and dot percentage.

FIGS. 5A and 5B are views illustrating a relationship between amount of ink adhesion, which is an amount of ink per unit area actually consumed at the time of printing, and dot percentage. FIG. 5A is a graph showing a relationship between optical density of ink and dot percentage. FIG. 5B is a graph showing a relationship between amount of ink adhesion and dot percentage. The amount of ink adhesion here is an amount of ink per pixel applied to the printing medium S. In FIG. 5, the amount of ink is shown in percentages, with 100 assigned to an amount of ink adhesion occurring when full-surface printing is done with maximum-dot droplets dischargeable from the nozzles of the printing machine 3.

As shown in FIG. 5A, the dot percentage is set proportional to the optical density of ink (or L* value in the CIELAB color system) obtained by measuring the printing medium S with a density meter. However, where the inks used by the printing machine 3 are the four colors of CMYK, as shown in FIG. 5B, the amount of each ink (amount of ink adhesion) of CMYK actually adhering to the printing medium S does not change proportionally to the halftone dot % (dot percentage), but changes describing a downwardly bulging curve under the influences of blotting of the ink, optical dot gain, and so on. That is, it can be said that the amounts of inks applied to the printing medium S tends to be less than the amounts of inks used for a certain of CMYK values.

In this invention, therefore, color patches with each of the CMYK values corrected by setting an upper limit to the amounts of inks per unit area that can be supplied to the printing medium based on the amounts (actual measurements) of inks actually consumed at the time of printing. Consequently, color can be expressed with a maximum amount of ink permitted by the printing medium S, and a bias of the color gamut in the color chart can be reduced.

Figure 6:
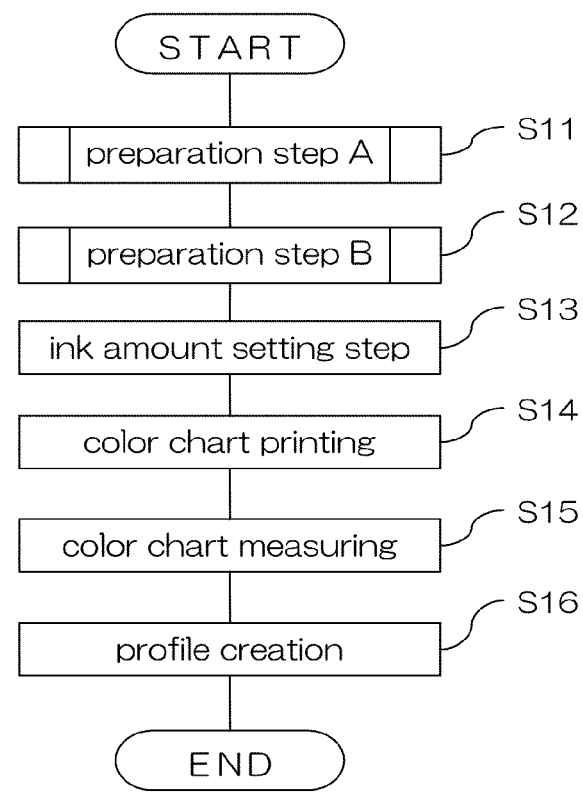
FIG. 6 is a flow chart of a color correcting method based on a color chart created by the color chart creating method of this invention.

FIG. 6 is a flow chart of a color correcting method based on a color chart created by the color chart creating method of this invention.

The color chart creating method in this embodiment executes an ink amount acquiring step consisting of preparation step A (step S11) and preparation step B (step S12) in advance of an ink amount setting step (step S13). Details of the ink amount acquiring step will be described hereinafter.

A color gamut is defined based on an upper limit of the ink amount per unit area set in the ink amount setting step (step S13), and a color chart (see the lower color chart CH2 in FIG. 4) having a plurality of color patches P arranged thereon is printed with the printing machine 3 (step S14). Subsequently, by measuring the printed color chart with the colorimetric machine 4 (step S15), a relationship is formed between L*a*b* values which are colorimetric values in a device-independent color space and CMYK values which are colorimetric values in a color space dependent on the printing machine 3 (device-dependent color space). That is, an ICC profile defining a relationship between the CMYK values of the printing machine 3 and the colors is created (step S16).

Figure 7:
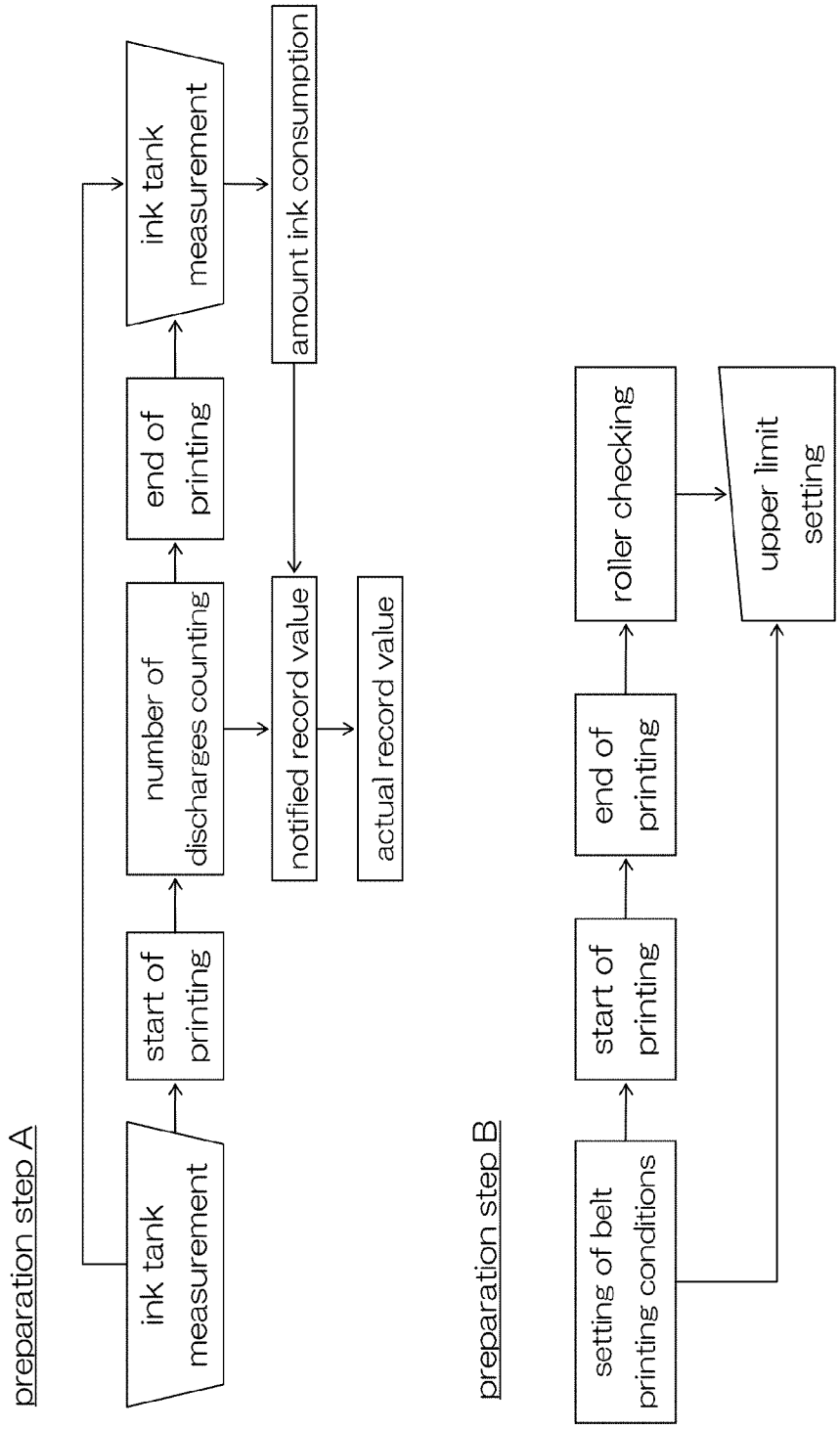
FIG. 7 is a flow chart of an ink amount acquiring step for obtaining an actual measurement and an upper limit of ink amount per unit area.

FIG. 7 is a flow chart of the ink amount acquiring step (above steps S11 and S12) for obtaining actual measurements and an upper limit of ink amount per unit area. In this embodiment, the operation for printing the color chart with the printing machine 3 is preceded by preparation step A (step S11 in FIG. 6) and preparation step B (step S12 in FIG. 6) in order to measure an amount of ink consumption and drying performance of the ink with respect to a predetermined one of CMYK values.

First, preparation step A is executed for acquiring actual measurements of ink amount per unit area. In preparation step A, images with an average consumption rate and dot percentage of each ink color of CMYK are printed with the printing machine 3 on two to three rolls of the printing medium S.

In preparation step A, the weights of the ink tanks 312 are measured ("ink tank measurement") before starting the printing, and then the printing is done on the printing medium S. During the printing, the number of discharges from the nozzles is counted for each inkjet head of a different ink color and for each of different dot sizes (e.g. S and L). Note that a dot size formation and an average amount of droplets per pixel with relation to dot percentages are known beforehand as mechanical performances of the printing machine 3. For dot percentage at 50%, for example, when a ratio of nozzles used to discharge inks is set to S-size dots:L-size dots=48.5: 1.3, an average amount of droplets per pixel will become 1 pl (picoliter). Consequently, a theoretical value of ink consumption can be calculated based on the number of discharges and dot percentage counted for each dot size. This theoretical value of ink consumption is displayed as notified record value on the printing control monitor 321 of the printing machine 3, for example.

When the printing is completed, weights of the ink tanks 312 of the printing machine 3 are measured, and weight differences of the ink tanks 312 before and after the printing are determined. That is, an actual record value of ink consumption is acquired. A difference between the notified record value which is the theoretical value of ink consumption and the actual record value of ink consumption is taken into consideration as an amount of correction to the notified record value, and the notified record value is thereafter treated as actual measurement reflecting the actual record value of ink consumption. The preparation step A, by printing average images, can acquire an actual measurement of ink consumption per unit area for each of the CMYK values regarding a plurality of colors. The above difference between the notified record value which is the theoretical value of ink consumption and the actual record value of ink consumption occurs as a result, for example, of changes in ink viscosity in response to the influence of temperature, which cause variations in the discharge rate from the inkjet heads 311.

Figure 8:
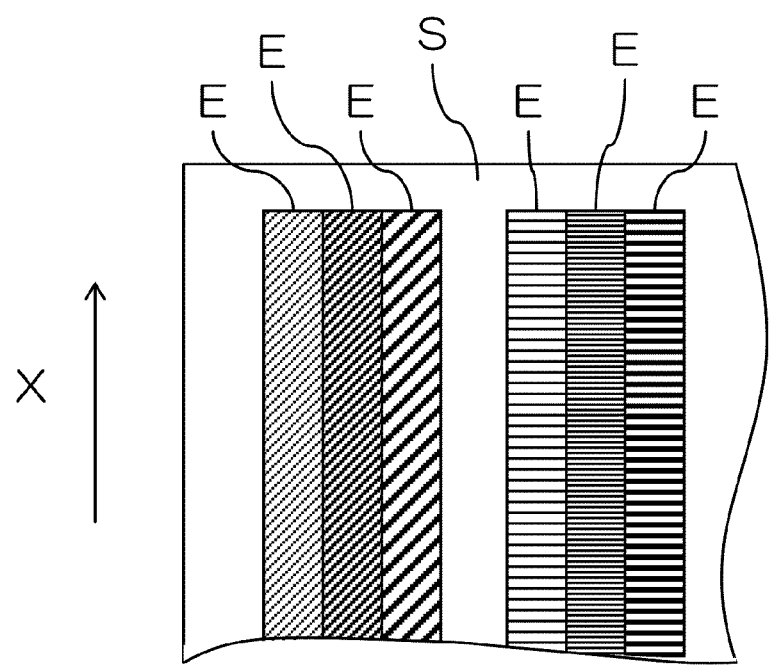
FIG. 8 is a schematic view illustrating belts E printed in preparation step B.

Next, preparation step B for measuring drying performance is executed. FIG. 8 is a schematic view illustrating belts E printed in preparation step B.

Preparation step B prints a plurality of beltlike areas (belts E) of different ink amounts on the printing medium S along a feeding direction X of the printing medium S (see FIG. 8). The ink amount here indicates an amount of ink per pixel supplied from each nozzle of inkjet head 311 to the printing medium S. FIG. 8 shows the differences in ink amount of the belts E in different hatches.

When belt printing conditions such as printing colors and ink amounts of the belts E have been set, the printing machine 3 is operated to perform belt printing. After the belt printing, checking is made as to which of the belts E of different ink amounts is/are responsible for an ink transfer to the roller of the printing machine 3. In this printing machine 3, the roller that contacts the printing surface of the printing medium S is the drive roller 335 (see FIG. 3). Therefore, the presence or absence of ink transfer to the drive roller 335 is checked. This checking may be done by visual observation of the operator, or by mechanical detection with a surveillance camera, sensor, or the like. The belts E are printed to extend along the feeding direction X of the printing medium S, and to form areas having amounts of ink varied axially of the drive roller 335 (see FIG. 8). Therefore, by checking in which position axially of the drive roller 335 an ink transfer has occurred, a correlation can be made easily between occurrence of an ink transfer to the roller and amount of ink.

The presence or absence of ink transfer to the roller is checked, and a maximum value of ink adhesion in the belts E free from the ink transfer to the roller among the printed belts E is set as an upper limit of ink amounts that can be applied per unit area. In setting for the belt printing, a density difference between each adjacent pair of belts E may be made small and the number of belts printed may be increased. Then, an upper limit of ink amounts that allow no ink transfer to the roller can be set with increased precision.

The belt printing may be performed for each ink of the primary colors (C, M, Y and K). In this case, an upper limit of ink amounts that can be applied per unit area may be set for each ink of the process colors having varied drying performances. Further, by performing similar belt printing for the secondary colors (C+M=blue, C+Y=green, and M+Y=red) and for the tertiary color (C+Y+M=black), an upper limit of ink amounts that can be applied per unit area may be set in a way that takes into consideration differences in drying performance when the inks of the process colors are superimposed. That is, by setting an upper limit to the ink amounts in greater detail for each color patch, a stricter definition of the color gamut can be made in the color chart.

The actual measurement of ink consumption per unit area for each predetermined one of CMYK values and the upper limit of ink amounts per unit area obtained from preparation step A and preparation step B described above are made into a control table and stored in a storage device (RAM 203 or HDD 207) of the image processing system 2. The image processing system 2 creates color patches with corrected CMYK values while referring to the actual measurements of ink consumption with respect to the CMYK values, so that each of the CMYK values of the plurality of color patches arranged on the color chart will not exceed the upper limit of ink amounts that can be applied per unit area. Subsequently, as described above, the color chart is printed by the printing machine 3 (step S14).

Referring back to FIG. 6, the color chart created by the color chart creating method described above is measured (step S15), and an ICC profile is created based on the colorimetric value of each color patch (step S16). These steps enable a color conversion of high color reproducibility at the time of performing printing with the printing machine 3.

The upper limit set in the ink amount setting step (step S13) may not be the upper limit obtained in the ink amount acquiring step (preparation step A and preparation step M. For example, the maker of the printing machine or the user of the printing machine may empirically set an upper limit based on upper limits obtained in the ink amount setting step previously executed using other printing machines or recording media.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2014-151431 filed in the Japanese Patent Office on Jul. 25, 2014, the entire disclosure of which is incorporated herein by reference.

What is claimed is:

1. A color chart creating method for creating a color chart having a plurality of color patches arranged thereon for color correction of an inkjet printer, the method comprising:
    an ink amount acquiring step for obtaining actual measurements of ink amounts with respect to colorimetric values in a device-dependent color space of each color patch based on the amounts of ink consumption when printing is done beforehand with the inkjet printer, and determining an upper limit of ink amount per unit area that can be supplied to a printing medium based on differences in drying performance when inks are superimposed;
    an ink amount setting step for setting an upper limit to ink amount per unit area obtained in the ink amount acquiring step that can be supplied to a printing medium, based on amounts of ink consumption when printing is done beforehand with the inkjet printer; and
    a printing step for printing with the inkjet printer the color chart having the plurality of color patches arranged thereon and formed of different colors on the printing medium using ink amounts smaller than the upper limit set in the ink amount setting step.

2. The color chart creating method according to claim 1, wherein the ink amount acquiring step is executed by observing an ink transfer to a transport roller which contacts a printing surface of the printing medium when beltlike areas of different ink amounts per unit area are printed for each of a plurality of colors beforehand on the printing medium with the inkjet printer, and setting an ink amount per unit area free from the ink transfer to the transport roller as the upper limit.

3. A color correcting method comprising:
    a colorimetric step for measuring with a colorimetric machine the color chart created by the color chart creating method according to claim 1; and
    a profile creating step for forming a relationship between device-independent color space and device-dependent color space based on a measurement result in the colorimetric step.

4. A color correcting method comprising:
    a colorimetric step for measuring with a colorimetric machine the color chart created by the color chart creating method according to claim 2; and
    a profile creating step for forming a relationship between device-independent color space and device-dependent color space based on a measurement result in the colorimetric step.

* * * * *